US010132532B2

(12) United States Patent
Petersen et al.

(10) Patent No.: US 10,132,532 B2
(45) Date of Patent: Nov. 20, 2018

(54) METHOD FOR OPERATING A COOLING SYSTEM AND A COOLING SYSTEM

(75) Inventors: Stefan Petersen, Berlin (DE); Walther Hüls Güido, Velten (DE)

(73) Assignee: TECHNISCHE UNIVERSITAET BERLIN, Berlin (DE)

( * ) Notice: Subject to any disclaimer, the term of this patent is extended or adjusted under 35 U.S.C. 154(b) by 237 days.

(21) Appl. No.: 14/343,215

(22) PCT Filed: Sep. 4, 2012

(86) PCT No.: PCT/DE2012/100263
§ 371 (c)(1),
(2), (4) Date: Jun. 30, 2014

(87) PCT Pub. No.: WO2013/034145
PCT Pub. Date: Mar. 14, 2013

(65) Prior Publication Data
US 2014/0326006 A1 Nov. 6, 2014

(30) Foreign Application Priority Data
Sep. 6, 2011 (DE) .......................... 10 2011 053 310

(51) Int. Cl.
| *F25B 27/02* | (2006.01) |
| *F25B 15/00* | (2006.01) |
| *F25B 39/02* | (2006.01) |
| *F25B 27/00* | (2006.01) |

(52) U.S. Cl.
CPC ............ *F25B 15/008* (2013.01); *F25B 15/00* (2013.01); *F25B 39/026* (2013.01); *F25B 27/00* (2013.01);
(Continued)

(58) Field of Classification Search
CPC ...... F25B 15/00; F25B 39/026; F25B 15/008; F25B 27/00; F25B 2315/00; F25B 2315/001; F25B 2315/002
See application file for complete search history.

(56) References Cited

U.S. PATENT DOCUMENTS

| 3,837,174 A | * | 9/1974 | Miyagi | ................. F25B 15/008 62/141 |
| 4,127,993 A | * | 12/1978 | Phillips | .................. F25B 15/02 62/101 |

(Continued)

FOREIGN PATENT DOCUMENTS

| DE | 2831042 A1 | 1/1980 |
| DE | 3520462 A1 | 12/1985 |

OTHER PUBLICATIONS

International Search Report dated Mar. 26, 2013 for PCT/DE2012/100263.
(Continued)

*Primary Examiner* — Frantz Jules
*Assistant Examiner* — Martha Tadesse
(74) *Attorney, Agent, or Firm* — Harness Dickey

(57) ABSTRACT

The invention relates to a method for operating a cooling system, in which a cooling agent is prepared in a reservoir of an evaporator device (1) of a single- or multi-stage sorption cooling system, a fluid to be cooled is cooled by having a heat exchanger of the evaporator device (1) effect a cooling heat transfer from the fluid to be cooled to the cooling agent for cooling purposes, and the cooling heat transfer causes the cooling agent to at least partially evaporate on the heat exchanger, and the evaporated cooling agent is relayed to a liquefier device (2), wherein the cooling heat transfer is improved by conveying external thermal energy provided by an external heat source (10) to the cooling agent, specifically in addition to and separately from the (Continued)

cooling heat transfer, and thereby initiating bubble formation that supports cooling heat transfer in the cooling agent in the reservoir, specifically by inducing bubble formation in conjunction with supplying the external thermal energy or intensifying bubble formation triggered by the cooling heat transfer. In addition, the invention relates to a cooling system in single- or multi-state configuration.

11 Claims, 3 Drawing Sheets

(52) U.S. Cl.
CPC ......... *F25B 2315/00* (2013.01); *Y02A 30/277* (2018.01); *Y02B 30/62* (2013.01)

(56) References Cited

U.S. PATENT DOCUMENTS

| | | | | |
|---|---|---|---|---|
| 5,345,786 | A * | 9/1994 | Yoda | F25B 15/02 62/476 |
| 5,548,971 | A * | 8/1996 | Rockenfeller | F25B 15/02 62/324.2 |
| 2005/0268633 | A1* | 12/2005 | Smith | B60H 1/3201 62/238.3 |
| 2006/0101848 | A1* | 5/2006 | Taras | F25B 39/00 62/515 |
| 2006/0150665 | A1* | 7/2006 | Weimer | F25B 15/14 62/476 |
| 2010/0186410 | A1* | 7/2010 | Cogswell | F01D 25/18 60/671 |
| 2011/0167864 | A1* | 7/2011 | Gu | F25B 15/04 62/476 |
| 2012/0000220 | A1* | 1/2012 | Altay | B64D 13/06 62/101 |
| 2012/0003510 | A1* | 1/2012 | Eisenhour | H01M 10/625 429/50 |

OTHER PUBLICATIONS

English translation of International Preliminary Report on Patentability for PCT/DE2012/100263 dated Mar. 20, 2014.

* cited by examiner

METHOD FOR OPERATING A COOLING SYSTEM AND A COOLING SYSTEM

The invention relates to a method for operating a cooling system, in particular a sorption cooling system, as well as to a cooling system in a single- or multi-stage configuration.

BACKGROUND

One technology in the field of refrigeration involves the sorption technique. Use is here made of heat, for example in the form of waste heat from technological processes, heat from cogeneration, solar heat or geothermal heating, for cooling a medium to be cooled, in particular a fluid.

Sorption cooling systems are known in the form of absorption cooling systems and adsorption cooling systems. The absorption cooling systems belong to the group of continuously operating sorption cooling systems. Liquid substances are used as absorbents. Conventional systems primarily operate with water/lithium bromide and ammonia/water as the substance pairs.

The absorption cooling machine can often be divided into two sections. In a first section, the absorption cooling system encompasses an absorber, an ejector drift, a pump and a restrictor. This section is often referred to as the thermal compressor. Solvent circulates therein. A second section of the absorption cooling system is equipped with a liquefier, an evaporator and a restrictor. In the evaporator, the prepared cooling agent is evaporated while absorbing thermal energy from the medium to be cooled. The evaporated cooling agent then travels to the absorber, where the evaporated cooling agent is absorbed by the solvent, specifically via absorption. The absorption enthalpy (solution enthalpy) released in the process must be dissipated. Absorption of the cooling agent turns a poor solution into a rich solution. A pump brings this solution from a low absorber pressure to a high ejector drift pressure. The solvent here routinely also flows through a counter flow heat exchanger. The latter helps to increase process efficiency by reducing the heat required by the ejector drift while simultaneously lowering the heat to be dissipated from the absorber. While supplying useful heat, the cooling agent is expelled from the solvent in the ejector drift, thereby generating cooling agent vapor, which subsequently is converted into the liquid phase in the liquefier. The cooling agent recovered in this way is again relayed to the evaporator via a restrictor.

As opposed to the absorption cooling system, which uses liquid absorbents, the adsorption cooling system is characterized by using the adsorption of the evaporated cooling agent by a solid substance (adsorbent). For example, substance pairings such as water/zeolite and water/silica gel are used in conjunction with adsorption cooling systems in the field of air conditioning technology.

Refrigeration systems have undergone an enormous growth rate on the market in past years. Longer cooling chains in the food industry, higher process performances and more comfortable living and working conditions require new, efficient refrigeration systems. Electrically powered compression systems are currently dominant. Thermally driven absorption and adsorption methods are also in use. Above all against the backdrop of increasing the efficiency of energy use, to include increasing that of cogeneration systems, the latter provide a resource-saving way, in a growing market for using cold temperatures, to not additionally raise the power demand, and instead utilize the waste heat from power production directly for refrigeration purposes.

SUMMARY

It is an object to provide improved technologies in conjunction with cooling systems, with which the efficiency of such systems can be increased.

According to claim 1, a method for operating a cooling system is provided. Also, a cooling system according to independent claim 10 is provided. Advantageous embodiments are the subject of dependent subclaims.

According to an aspect a method for operating a cooling system is provided.

A cooling agent used while circulating is prepared in a reservoir of an evaporator device of a single- or multi-stage sorption cooling system. A fluid to be cooled is cooled by having a heat exchanger of the evaporator device effect a cooling heat transfer from the fluid to be cooled to the cooling agent for cooling purposes. The cooling heat transfer causes the cooling agent to at least partially evaporate on the heat exchanger, and the evaporated cooling agent is relayed to a liquefier device. The cooling heat transfer is improved by conveying external thermal energy provided by an external heat source to the cooling agent, specifically in addition to and separately from the cooling heat transfer, and thereby initiating bubble formation that supports cooling heat transfer in the cooling agent in the reservoir, specifically by inducing bubble formation in conjunction with supplying the external thermal energy or intensifying bubble formation triggered by the cooling heat transfer.

According to another aspect of the invention, a cooling system with a single- or multi-stage configuration is provided, comprising:

an evaporator device configured to transfer cooling heat energy from the fluid to be cooled to a cooling agent provided in a reservoir and used in circulation by means of a heat exchanger for cooling a fluid to be cooled, and thereby at least partially evaporating the cooling agent on the heat exchanger;

a liquefying device that is fluidically connected with the evaporator device and configured to absorb/adsorb the evaporated cooling agent in a solvent;

an ejector drift/desorber device fluidically connected with the liquefying device and configured to expel the cooling agent absorbed by the solvent by expending useful heat, and a liquefier fluidically connected with the ejector drift/desorber device and the evaporator device and configured to liquefy the expelled cooling agent and dispense the liquefied cooling agent for transfer to the evaporator device;

wherein the evaporator device is coupled to a heat supplying device configured to convey external thermal energy provided by an external heat source to the cooling agent in the reservoir, specifically in addition to and separately from the cooling heat transfer, so as to initiate bubble formation in the cooling agent in the reservoir that supports cooling heat transfer from the fluid to be cooled to the cooling agent, specifically by inducing bubble formation in conjunction with supplying the external thermal energy or intensifying bubble formation triggered by the cooling heat transfer.

The invention comprises the idea of optimizing the cooling or refrigerating capacity in the evaporator device, i.e., the transfer of thermal energy from the fluid to be cooled to the cooling agent, by (additionally) supplying external thermal energy provided by an external heat source to the cooling agent in the reservoir of the evaporator device. This external thermal energy is used to practically externally excite the cooling agent in the reservoir so as to induce bubble formation or amplify bubble formation already triggered by the cooling heat transfer. The latter can be the result of a so-called pool-boiling process, which is initiated by the cooling heat transfer from the fluid to be cooled to the cooling agent in the reservoir with the cooling agent.

The amplification of already triggered bubble formation can here involve extending an already existing bubble formation process for longer than would actually be possible via cooling heat transfer from the fluid to be cooled to the cooling agent, or expanding the bubble formation hereby initiated, i.e., in particular forming additional bubbles.

Bubble formation in the reservoir with the cooling agent supports cooling heat transfer from the fluid to be cooled to the cooling agent in the heat exchanger in a variety of ways. On the one hand, bubble formation initiates or supports the occurrence of waves or other movements of the cooling agent, as a result of which, for example given a heat exchanger with reheat coils dipping into the cooling agent, contact between the surface of the reheat coils of the heat exchanger and cooling agent is expanded. This also elevates the flow rate of the cooling agent along the surface of the heat exchanger, which in turn helps to improve cooling heat transfer.

Various effects improve the efficiency of heat transfer between the fluid to be cooled and the cooling agent. For example, bubble formation can increase the number of spatters catapulted out of the cooling agent that strike the surface of the single- or multi-module heat exchanger, thereby optimizing the heat transfer from the fluid to be cooled to the cooling agent. These positive effects overcompensate for any adverse effects that may arise on the cooling agent due to the introduction of external heat, for example an additional outlay in the components of the cooling system downstream from the evaporator device.

The external thermal energy additionally conveyed to the cooling agent in the evaporator device can be provided by any external heat sources. It is preferably provided that process-internal exhaust heat, exhaust heat from other processes, heat from cogeneration, solar heat and/or geothermal heat be supplied.

For example, the cooling system is a sorption cooling system. The liquefying device is then designed as an adsorption/absorption device.

A further development provides that, in conjunction with the supply of external thermal energy, a boiling state or boiling-like state be induced for the cooling agent in the reservoir, which respectively encompasses bubble formation. The creation of a boiling state or boiling-like state for the cooling agent can also be referred to as so-called pool boiling. It can here be provided that a boiling state or boiling-like state already be triggered by the cooling heat transfer from the fluid to be cooled to the cooling agent. Additionally conveying external thermal energy to the cooling agent then intensifies this state and/or lengthens its duration. The boiling state or boiling-like state are characterized especially by bubble formation, which according to the above effects lead to an improved heat transfer between the fluid to be cooled and the cooling agent.

An embodiment can provide that the cooling agent in the reservoir be supplied with at least part of the external thermal energy by mixing a substance into the cooling agent. In one embodiment, the cooling agent is here enhanced with a substance by admixing cooling agent itself and/or one or more substances compatible herewith to the cooling agent, wherein the admixed substances supply the cooling agent in the reservoir with the external thermal energy.

One advantageous embodiment provides that the cooling agent in the reservoir be supplied with at least part of the external thermal energy via thermal transfer not involving the use of substances. In this embodiment, external thermal energy transfer to the cooling agent takes place at least partially without mixing or admixing any substances. For example, a fluid in a heat exchanger is guided separately from the cooling agent as the substance in such a way that external thermal energy transfer from the external fluid to the cooling agent takes place on the surface of the heat exchanger.

One further development provides that the external thermal energy be supplied by a streaming fluid, whose fluid temperature is higher than the temperature of the cooling agent in the reservoir, at least prior to conveying the external thermal energy to the cooling agent. The external thermal energy transfer initiated in this way can be provided in conjunction with both the process in which substances are admixed and the process in which heat transfer takes place without using any substances.

An advantageous embodiment can provide that the external thermal energy be supplied by a streaming fluid, whose fluid temperature is higher than the temperature of the fluid to be cooled, at least prior to cooling via the transfer of cooling heat energy from the fluid to be cooled to the cooling agent.

A further development can provide that one or more line segments of the heat exchanger in the evaporator device that carry the fluid to be cooled be designed to at least partially dip into the cooling agent in the reservoir. If the line segments of the heat exchanger carrying the fluid to be cooled only dip partially into the cooling agent, the induced bubble formation can cause additional surface segments of the heat exchanger lines that had previously not been wetted with the cooling agent to come into contact with the cooling agent. This may result from an undulation in the reservoir triggered by the bubble formation and/or spatters forming in the area of the cooling agent surface.

A further development provides that one or more of the line segments of the heat exchanger in the evaporator device that carry the fluid to be cooled be sprinkled with the cooling agent from the reservoir.

An embodiment can provide that the external thermal energy be supplied as heat from one of the following processes: Exhaust heat from a technological process, heat from cogeneration, solar heat and geothermal heat.

In conjunction with the cooling system, the comments about embodiments and advantages made in relation to the method for operating the sorption cooling system apply accordingly.

DESCRIPTION OF PREFERRED EXEMPLARY EMBODIMENTS

The invention will be described in greater detail below based on preferred exemplary embodiments, making reference to figures on a drawing. Shown on:

Figure 1:
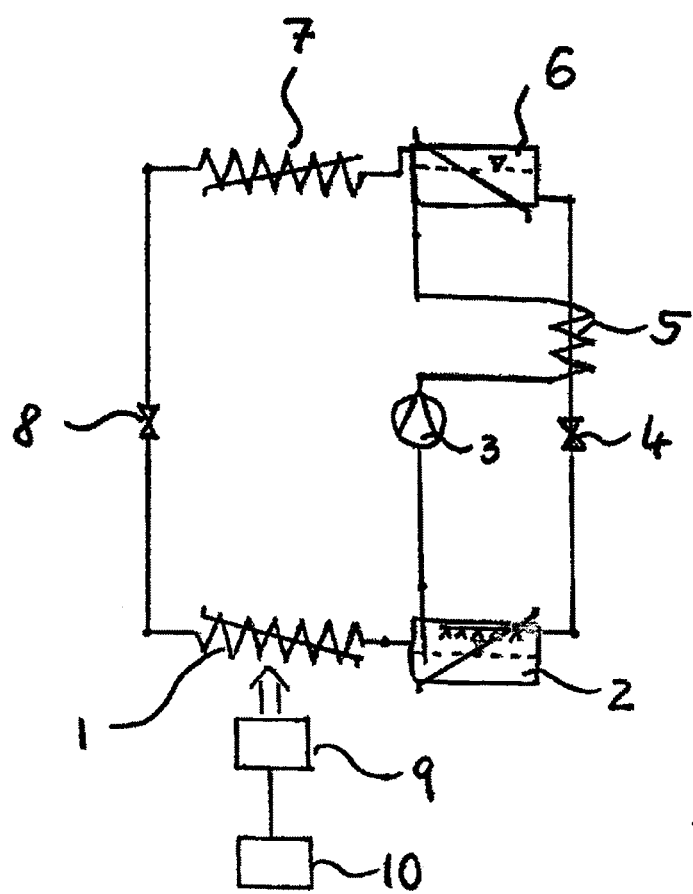
FIG. 1 is a schematic view of a sorption cooling system in a single-stage configuration.

FIG. 1 presents a schematic view of a sorption cooling system with a single-stage configuration, which is designed as an absorption cooling machine.

In an evaporator device 1, a heat exchanger is used to remove cooling heat from a fluid to be cooled by means of a cooling agent, in such a way that the cooling agent is evaporated on the surface of a heat exchanger device used for this purpose. The cooling heat here removed from the fluid to be cooled determines the cooling or refrigerating capacity of the sorption cooling system. The evaporated cooling agent is relayed to an absorber device 2, where the evaporated cooling agent is absorbed by a solvent. In the absorption cooling machine, this takes place via absorption by the liquid solvent. Given an adsorption cooling machine, the liquid solvent is replaced by a solid substance, which adsorbs the evaporated cooling agent.

In the sorption cooling system according to FIG. 1, the solvent is then brought from the lower absorber pressure to a high ejector drift pressure by means of a pump 3, and passes through a counter flow heat exchanger 5 to an ejector drift device 6, where the cooling agent previously absorbed by the solvent is expelled with the addition of useful heat to be applied. The cooling agent vapor generated here then arrives at a liquefier device 7, in which the cooling agent vapor is liquefied, and then returned to the evaporator device 1 via an additional restrictor 8. The solvent concentrated in this way is again returned to the absorber device 2 via a restrictor 4.

The evaporator device 1 on FIG. 1 is coupled with a heat supplying device 9, with which external thermal energy is conveyed from an external heat source 10 to the cooling agent in the evaporator device 1. The purpose of this is to induce bubble formation in the cooling agent, which is kept in a reservoir in the evaporator device 1 in the form of a pool or sump, or to intensify an already existing bubble formation.

In the evaporator device 1, the cooling agent is subjected to an evaporation process on the heat exchanger device. As a rule, the evaporation heat of a fluid is a multiple of the specific thermal capacity of the fluid, so that no use is made of adiabatic evaporation, in which the fluid is heated in advance under a higher temperature, even if several such applications are basically known. For this reason, tube bundle heat exchangers are often used in the area of evaporator devices, leaving the space necessary for the vapor flow. Such heat exchangers can be operated according to at least three different operating principles, wherein mixed forms can also be used. The various designs can be used in evaporator device 1, and will be explained in greater detail below.

In a frequent first design, a heat exchanger tube bundle that carries the fluid to be cooled is dipped into the cooling agent. The cooling agent is motionless or flows in a reservoir. The heat exchanger design is relatively compact, but material intensive. Several sumps arranged one over the other like floors can also be used, so that the heat exchanger tubes can only be minimally covered in each individual sump. In this configuration, the several sumps together form the reservoir with the cooling agent.

In a second design, a tube bundle as before carries a fluid, which is intended to release heat. However, the cooling agent is sprinkled over the tube bundle of the heat exchanger, and trickles down on the tube bundle. The thinly flowing film has good heat and mass transfer values. Under these circumstances, the design requires more space than the variant described above. An improved wetting of the heat exchanger bundle is achieved by recirculating unevaporated fluid, so that the heat exchanger surface can be optimally used primarily under a partial load, but also under a full load.

The third principle follows the second design, but works without recirculation. A specific quantity of cooling agent fluid is sprinkled over the tube bundle. Before it drips into the sump, complete evaporation can here now take place. Significant portions of dry heat exchanger surface must as a rule be set aside for this purpose. As an alternative, unevaporated cooling agent drips away, and is then usually irreversibly returned to the process. A suitable dispensing/sprinkling system makes it possible to effectively use the heat exchanger in a defined operating condition to avoid dry spots. All aforementioned designs of the heat exchanger share in common that the cooling agent to be evaporated absorbs precisely the heat released by the fluid to be cooled.

All designs described above can be advantageously used in the evaporator device 1. The function will be exemplarily explained in greater detail below based on a partially flooded film-type heat exchanger. The advantageousness for other designs may be derived from the latter.

According to the invention, one configuration utilizes heat, vapor and/or gas streams to supply external heat to the cooling agent. This imparts motion to the cooling agent to be evaporated in the pool, which can end up leading to the formation of a boiling or boiling-like state. Since various embodiments for pool evaporators along with their optimized layout as a function of thermal flux densities and the fluid to be evaporated are known as such, they will not be explained in greater detail here.

During operation, a boiling process in the cooling agent reservoir can take place of its own accord. The temperature differences between the cooling agent to be evaporated and the external medium to be cooled are here available, and as a rule measure a few Kelvin. The provided introduction of external heat into the cooling agent generates higher excess temperatures.

The supplied external heat can originate wherever desired. In one embodiment, the heat supplied is high enough to generate boiling or a boiling-like state in the reservoir. The cooling agent is externally excited by the associated bubble formation in the reservoir.

Vapor and/or gas streams can also be used to convey the external heat to the cooling agent in the evaporator device 1, and hereby generate rising bubbles, i.e., achieve a boiling state or a boiling-like effect. This imparts motion to the cooling agent, and spatters can also be induced. When using vapor streams, the vapor can also undergo a phase change.

In all approaches taken to externally excite the cooling agent (external heat transfer), the transfer of heat in the evaporator device 1 between the fluid to be cooled and the cooling agent is distinctly improved by increasing the speed of the cooling agent on the heat exchanger surface. Two additional effects further improve the cooling heat transfer from the cooling fluid to the cooling agent on the heat exchanger. On the one hand, dry locations of the heat exchanger of the partially flooded evaporator are wetted by the waves emanating from the boiling cooling agent, and then actively participate in heat transfer. On the other hand, boiling makes the liquid drops or volume elements of the cooling agent become distributed in the tube bundle, in part at least randomly. In so doing, they help better wet the bundle, and increase the speed of the potentially present and downwardly trickling film of the cooling agent through momentum transfer. This leads to improvement in the heat transfer coefficient for the cooling agent on the tube. Taken together, these positive effects thereby overcompensate for the disadvantages of the useful load, i.e., the external heat conveyed to the cooling agent, for the downstream component in the sorption cooling system, specifically the absorber device 2 in particular.

Figure 2:
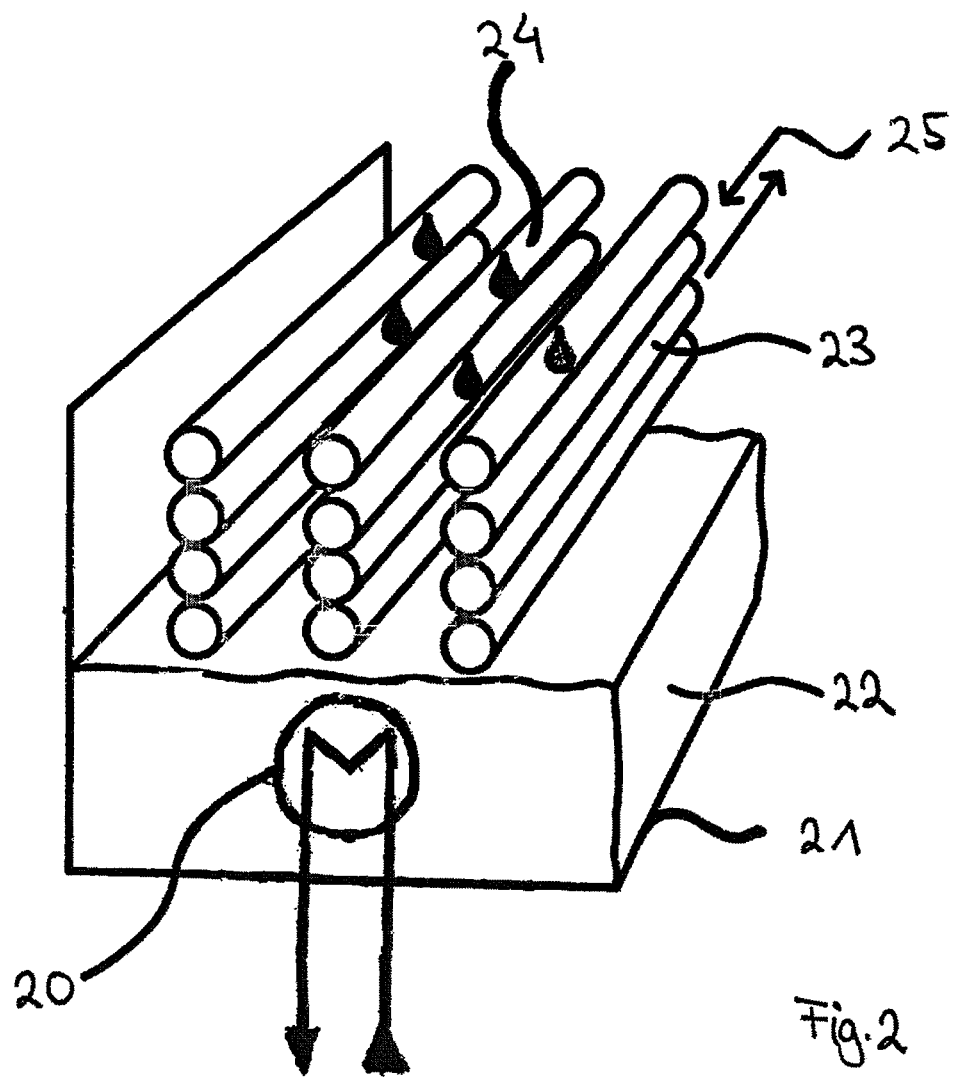
FIG. 2 is a schematic view of an evaporator device for a sorption cooling system, in which external thermal energy is supplied to the cooling agent without admixing any substances.
Figure 3:
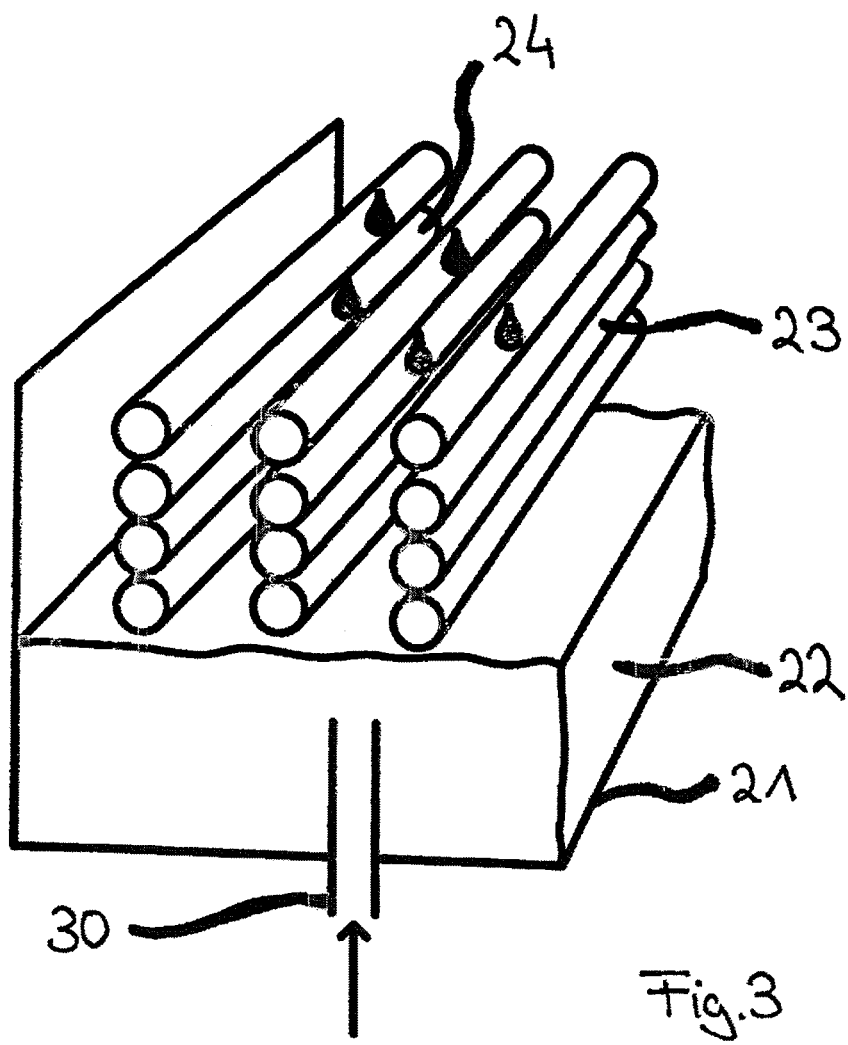
FIG. 3 is a schematic view of an evaporator device for a sorption cooling system, in which external thermal energy is supplied to the cooling agent by admixing substances.

FIGS. 2 and 3 present schematically differing embodiments for introducing the external thermal energy in conjunction with evaporator device 1.

In the embodiment on FIG. 2, the external thermal energy is introduced with the help of an additional heat exchanger 20, which carries a heated fluid, and is arranged in the cooling agent 22 in the reservoir 21 allocated to the evaporator device 1 in the sorption cooling device on FIG. 1. Line or tube sections 23 of a heat exchanger 24 situated above the latter carry the fluid 25 to be cooled in the sorption cooling system. The additional heat exchanger 20 acts as a heat supplying device, and serves to induce or amplify in the cooling agent 22 the bubbles that assist in conveying heat from the fluid 25 to be cooled to the cooling agent 22.

In the embodiment according to FIG. 3, in which the same reference numbers as on FIG. 2 are used for identical features, the external thermal energy is conveyed to the cooling agent 22 by using a feed line 30 to introduce additional cooling agent that exhibits an elevated temperature by comparison to the cooling agent in reservoir 21. This causes the cooling agent 22 located in the reservoir 21 to become materially mixed with the additional cooling agent. The inflow leads to a boiling or development of a boiling-like state accompanied by bubble formation in the reservoir 21.

The evaporative powers for different excitations are summarized in the following Table 1.

For the experimental tests, a pipe secured under an evaporator reservoir fluidically connected with the reservoir was heated from outside (see embodiment on FIG. 2). In measurements (4) to (6), the pipe was arranged under the reservoir. In measurements (7) and (8), the pipe was placed after an arc that allows the pipe to continue running on the side facing away from the reservoir in a horizontal position.

Measurements (1) to (3) are comparative measurements, in which no external heat was supplied to the cooling agent in the reservoir.

The respectively applied evaporative powers for the experimentally examined evaporator device were measured. It was found that the evaporative power could be significantly increased when using the external heat.

TABLE 1

| Measurement | Brief description | Power |
|---|---|---|
| (1) to (3) | Evaporative power (comparative measurement) | 38.47 kW |
|  |  | 38.64 kW |
|  |  | 38.24 kW |
| (4) to (6) | Evaporative power with heated perpendicular pipe (tests) | 49.24 kW |
|  |  | 48.16 kW |
|  |  | 48.38 kW |
| (7), (8) | Evaporative power with heated horizontal pipe (tests) | 45.36 kW |
|  |  | 44.97 kW |

The described technologies can support the compactness of the system construction in sorption cooling systems, regardless of whether it is the absorption or adsorption technology. The primary components in these systems, such as the evaporator, absorber, desorber and capacitor, are often heat exchangers that all transport heat between external and internal media. These heat exchangers are here responsible for up to 50% of the costs and as much as 75% of the volume in the cooling system. The greatest potential for improving these refrigerating systems lies in optimizing the layout and function.

The described technologies relate in particular to optimizing the vapor generation in evaporation processes for refrigeration in sorption cooling systems. Above all cooling systems in which the process takes place under a vacuum can benefit substantially from this, without there being any limitation to this application. In particular, the technologies can also be used in other refrigeration systems. In principle, use is possible in all applications in which a fluid is to evaporate in portions on a heat exchanger surface, thereby being present in two phases in its immediate proximity.

The features disclosed in the above specification, the claims and the drawing can be important for implementing various embodiments, whether taken separately or in any combination desired.

The invention claimed is:

1. A method for operating a cooling system, comprising the following steps:
a cooling agent is prepared in a reservoir of an evaporator device of a single- or multi-stage sorption cooling system;
a fluid to be cooled is cooled by having a heat exchanger of the evaporator device effect a cooling heat transfer from the fluid to be cooled to the cooling agent for cooling purposes, and
the cooling heat transfer causes the cooling agent to at least partially evaporate on the heat exchanger, and the evaporated cooling agent is relayed to a liquefier device,
wherein the cooling heat transfer is improved by conveying external thermal energy provided by an external heat source to the cooling agent in the evaporator while the fluid is being cooled in the cooling system, specifically in addition to and separately from the cooling heat transfer, and thereby initiating bubble formation by a pool-boiling process that supports cooling heat transfer in the cooling agent in the reservoir, specifically by inducing bubble formation in conjunction with supply the external thermal energy or intensifying bubble formation triggered by the cooling heat transfer.

2. The method according to claim 1, wherein in conjunction with the supply of external thermal energy, a boiling state or boiling-like state is induced for the cooling agent in the reservoir, which respectively encompasses bubble formation.

3. The method according to claim 1, wherein in that the cooling agent in the reservoir is supplied with at least part of the external thermal energy by mixing a substance into the cooling agent.

4. The method according to claim 1, wherein the cooling agent in the reservoir is supplied with at least part of the external thermal energy via thermal transfer not involving the use of substances.

5. The method according to claim 1, wherein the external thermal energy is supplied by a streaming fluid, whose fluid temperature is higher than the temperature of the cooling agent in the reservoir, at least prior to conveying the external thermal energy to the cooling agent.

6. The method according to claim 1, wherein the external thermal energy is supplied by a streaming fluid, whose fluid temperature is higher than the temperature of the fluid to be cooled, at least prior to cooling via the transfer of cooling heat energy from the fluid to be cooled to the cooling agent.

7. The method according to claim 1, wherein one or more line segments of the heat exchanger in the evaporator device that carry the fluid to be cooled are designed to at least partially dip into the cooling agent in the reservoir.

8. The method according to claim 1, wherein one or more of the line segments of the heat exchanger in the evaporator device that carry the fluid to be cooled are sprinkled with the cooling agent from the reservoir.

9. The method according to claim 1, wherein the external thermal energy is supplied as heat from one of the following processes: Exhaust heat from a technological process, heat from cogeneration, solar heat and geothermal heat, and heat from a process-internal fluid stream in the cooling system.

10. Cooling system in a single- or multi-stage configuration, comprising:
   an evaporator device configured to transfer cooling heat energy from a fluid to be cooled to a cooling agent provided in a reservoir and used in circulation by means of a heat exchanger for cooling the fluid to be cooled, and thereby at least partially evaporating the cooling agent on the heat exchanger;
   a liquefying device that is fluidically connected with the evaporator device and configured to absorb/adsorb the evaporated cooling agent in a solvent;
   an ejector drift/desorber device fluidically connected with the liquefying device and configured to expel the cooling agent absorbed by the solvent by expending useful heat, and
   a liquefier fluidically connected with the ejector drift/desorber device and the evaporator device and configured to liquefy the expelled cooling agent and dispense the liquefied cooling agent for transfer to the evaporator device;
   wherein the evaporator device is coupled to a heat supplying device configured to convey external thermal energy provided by an external heat source to the cooling agent in the reservoir, specifically in addition to and separately from the cooling heat transfer from the fluid to be cooled to the cooling agent, specifically inducing bubble formation by a pool-boiling process in conjunction with supplying the external thermal energy or intensifying bubble formation triggered by the cooling heat transfer.

11. The method according to claim 2, wherein in that the cooling agent in the reservoir is supplied with at least part of the external thermal energy by mixing a substance into the cooling agent.

* * * * *